United States Patent [19]
Lenzner

[11] Patent Number: 4,616,442
[45] Date of Patent: Oct. 14, 1986

[54] PLANT SUPPORT

[76] Inventor: Phillip M. Lenzner, 6438 Virginia, St. Louis, Mo. 63111

[21] Appl. No.: 645,169

[22] Filed: Aug. 28, 1984

Related U.S. Application Data

[63] Continuation-in-part of Ser. No. 336,447, Dec. 31, 1981, abandoned.

[51] Int. Cl.$^4$ ............................................. A01G 17/06
[52] U.S. Cl. ...................................................... 47/45
[58] Field of Search ................... 47/45, 44, 46, 47, 42, 47/20, 21, 31, 30, 26, 27, 28, 28.1, 29; 135/20 R, 98, 99

[56] References Cited

U.S. PATENT DOCUMENTS

| | | | |
|---|---|---|---|
| 185,263 | 12/1876 | Sands | 47/45 |
| 315,605 | 4/1885 | Ellis | 135/98 |
| 377,444 | 2/1888 | Watrous | 47/44 |
| 2,621,669 | 12/1952 | Mayer | 135/20 R |
| 3,706,160 | 12/1972 | Deibert | 47/21 |

FOREIGN PATENT DOCUMENTS 346721  7/1960  Switzerland .

Primary Examiner—Robert A. Hafer
Assistant Examiner—Bradley M. Lewis
Attorney, Agent, or Firm—Cohn, Powell & Hind

[57] ABSTRACT

A plant support includes a loosely fitting housing which is receivable by a plant stake and provides flexible non-rigid support elements connectible to the housing and extending downwardly therefrom for supporting the plant. Slots are provided in the housing through which flexible straps are received that are utilized to support a plant on the stake. Openings are provided in the housing for the attachment of additional cords and straps. The housing is hollow thereby allowing storage of the flexible support elements within the housing when the plant support is not in use.

6 Claims, 5 Drawing Figures

PLANT SUPPORT

This is a continuation-in-part of U.S. Ser. No. 336,447 filed Dec. 31, 1981, now abandoned.

BACKGROUND OF THE INVENTION

This invention relates generally to plant supports and particularly to a plant support providing a housing carried by a plant stake and employing flexible means connected to the housing for supporting the plant.

In the growing of many plants it is desirable to provide means for supporting the plants. For instance, in the case of tomato plants, a stake or stick is often used for supporting the plant. By tying the plant to the stake, the branches and leaves are supported and can be held above the ground level. When the branches are allowed to droop and lie on the ground, ground rot can occur which will result in ruining the fruit. Therefore, it is desirable that the leaves and fruit be supported above ground level. Conventionally, ropes or straps must be individually tied and are often subject to slippage down the stake since it is desirable not to too tightly tie the tomato plant to the stake.

This invention solves these and other problems in a manner not revealed by the known prior art.

SUMMARY OF THE INVENTION

This plant support provides a support which is readily attachable to a conventional plant stake and provides for support of the plant as it grows in order to prevent ground rot.

The plant support includes a housing which is supportably receivable by the plant stake. Flexible means are connected to the housing and extend downwardly therefrom for supporting the plant.

In one aspect of the invention, the flexible means includes netting, which extends downwardly about the stake and plant for supporting the plant. In another aspect of the invention, the housing includes an upper end having an opening and the netting extends from within the housing out of the open end. In still another aspect of the invention the netting includes a knotted end within the housing, the knot retaining the netting within the housing for connecting the netting to the housing.

In another aspect of the invention, the flexible means includes a plurality of straps that are carried by the housing for selective attachment to the plant for supporting the plant. In still another aspect of the invention, the housing includes opposed side slots and the straps extend through the slots and down opposed sides of the housing. In another aspect of the invention the straps are perforated at intervals to facilitate attachment to the plant and tie means are receivable by the strap perforations for supporting the plant.

In still another aspect of the invention the housing has an upper end portion and a lengthwise extending sidewall portion, the housing being sized to receive the plant stake therewithin, the stake upper end portion being engageable by the housing upper end portion and the housing being retained on the stake in liftably removable relation without the need for fasteners.

In another aspect of the invention, the housing is hollow and has a bottom opening and a relatively smaller top opening. The plant support netting is collapsible and receivable within the housing when not in use. The netting extends through the top opening and down and about the plant for supporting the plant when in use.

DESCRIPTION OF THE PREFERRED EMBODIMENT

Figure 1:
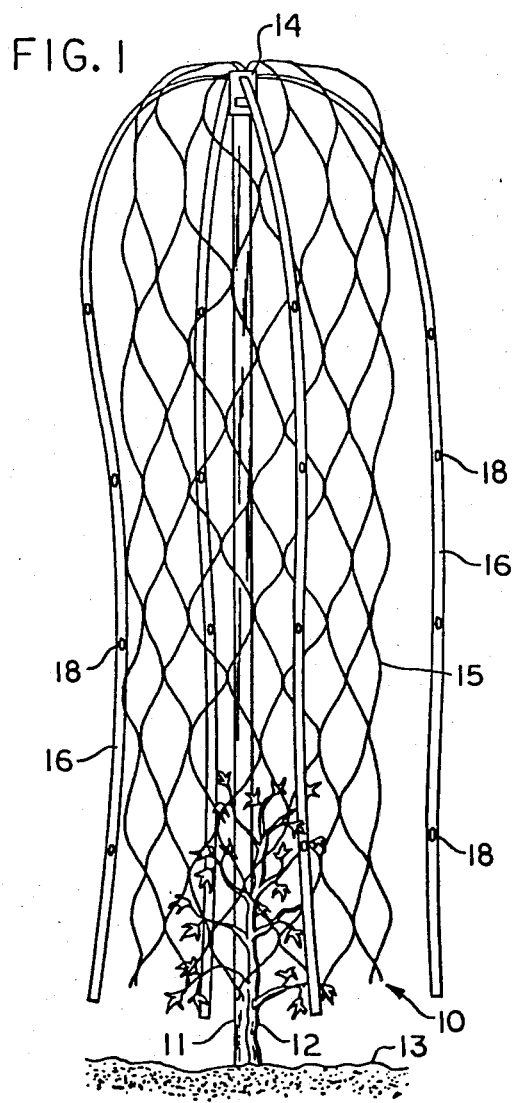
FIG. 1 is an elevational view of a plant support showing the plant support in use with a relatively small plant.

Referring now by characters of reference to the drawings and first to FIG. 1, it will be understood that the plant support, indicated generally by numeral 10, is intended to be used in conjunction with a plant stake 11 and for supporting a plant 12. As is conventional, the plant stake 11 is inserted into the ground 13 adjacent to the small or young plant 12.

The plant support 10 includes a housing 14 which is receivable on the upper end of the plant stake 11. In the preferred embodiment the elongate tubular housing 14 includes an upper end portion 14a and a lengthwise extending sidewall portion 14b. The internal lateral dimensions of the housing are sized to receive the plant stake 11 therewithin and are sufficiently greater than the size of the stake 11 so that the stake 11 fits rather loosely into the housing 14 to facilitate removal of the housing by simply lifting it from the stake.

Figure 2:
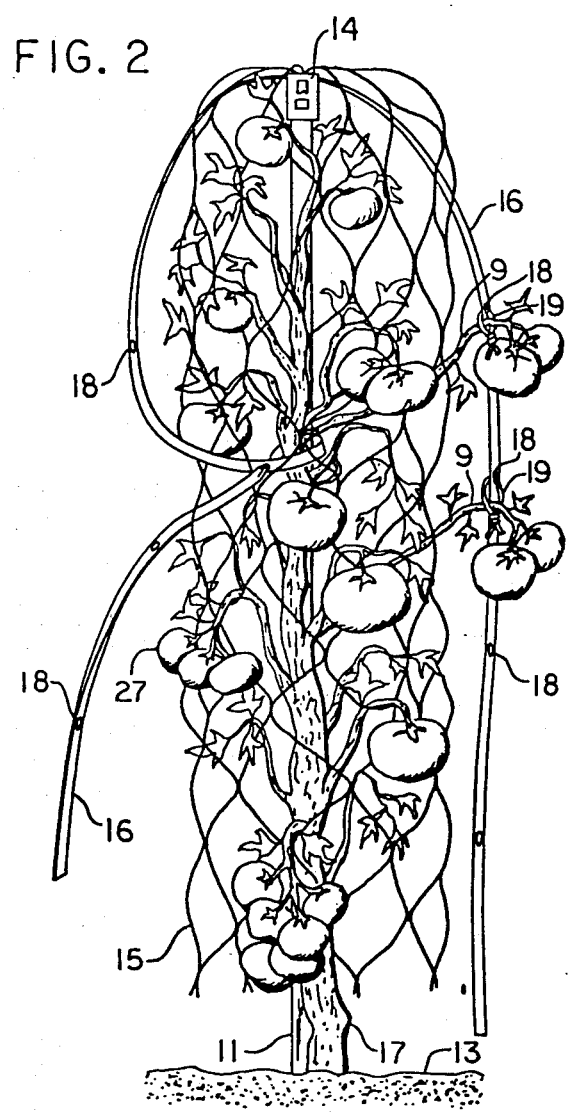
FIG. 2 is an elevational view of a plant support showing the plant support in use with a relatively large plant.

Connected to the housing 14 is a section of flexible tubular netting 15 extending downwardly from the housing 14 about the stake 11 and plant 12. Also connected to the housing 14 are a plurality of flexible non-rigid straps 16. The straps 16 are perforated at intervals along their length as by a plurality of openings 18. As shown in FIG. 2, individual plant branches 9 can be supported by a twist wire 19 providing tie means attached to the straps 16 at openings 18. The straps 16 can also be used to facilitate the formation of connection loops to attach a large or fully grown plant 17 to the stake 11.

Figure 3:
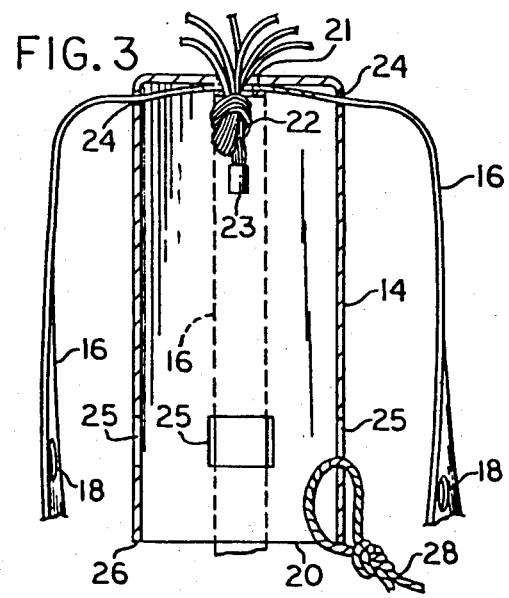
FIG. 3 is an elevational view, partially in cross section, of a plant supporting housing.

Referring now to FIG. 3, it will be seen that the housing 14 includes a relatively large bottom opening 20 and a relatively small top opening 21.

It will be understood that the netting 15 preferably is constructed of plastic material and has generally diamond-shaped openings, which are elongated or foreshortened depending on the diameter of the tubular form required, and can be fully collapsed into a rope-like length of material of about one quarter inch ($\frac{1}{4}''$) thick. A ferrule or clip 23 closes the end of the tubular netting 15. The netting end with the clip 23 can be inserted into the housing top opening 21 and drawn through the housing to the lower opening 20 where a knot 22 can be made in the netting line 15 and the knotted end of the netting can be drawn back into the housing 14 until the knot engages the margin of the top opening 21. The netting 15 is turned inside out and folded down about the housing and about the stake 11 and plant 12 as in FIG. 1.

As shown in FIG. 3, the housing 14 includes a plurality of opposed side slots 24 which, in the preferred embodiment, are located adjacent to the top of the housing 14. The straps 16 are receivable through opposed side slots 24, such that a single strap 16 can extend downwardly from two sides of the housing 14. In the embodiment disclosed in the drawing, a total of four (4) slots are provided. Additionally, a plurality of side openings 25 are provided adjacent to a lower margin 26 of the housing 14. The side openings 25 provide convenient tie points for attachment of additional ropes, straps or other support means 28, as shown in FIG. 3, that may be required in order to provide additional support for a particular plant.

Figure 4:
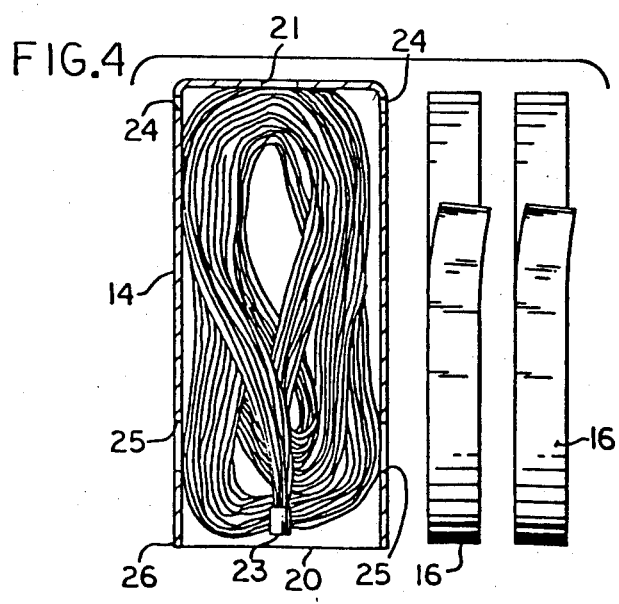
FIG. 4 is an elevational view, partially in cross section, of a plant support housing with a collapsible plant support netting and plant support straps.

When not in use, the plant support 10 is conveniently storable and shippable. The netting 15 can be readily collapsed, folded and inserted fully within the housing 14 as shown in FIG. 4. When it is desired to use the plant protector 10 the netting 15 is removed from the housing 14. The straps 16 are each inserted through a slot 24, and out an opposite slot so that the openings 18 of each strap are in register. The clip 23 of the netting 15 is inserted through the top opening 21 and openings 18 in the straps 16 and the netting 15 is pulled into the housing 14 and knotted. The knotted netting 15 prevents the straps 16 from being inadvertently pulled from the housing 14.

It is thought that the structural features and functional advantages of the plant support 10 have become fully apparent from the foregoing description of parts but for completeness of disclosure a brief explanation of the use of the support will be given.

Figure 5:
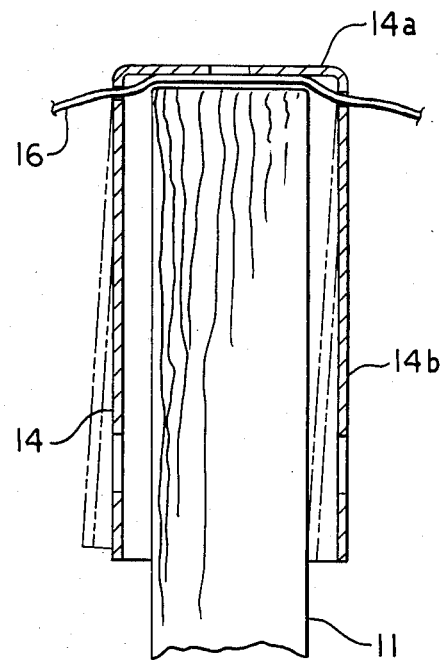
FIG. 5 is a similar view to FIG. 4 but showing the plant stake within the housing.

The stake is operatively engaged by the upper end portion of the housing which is retained by the stake without the need for fasteners and can be readily removed from the stake by simply lifting it upwardly as shown in FIG. 5.

The housing internal width dimensions are sufficiently greater than the size of the stake so that the housing can easily be emplaced and removed by simply lowering it onto and lifting it from the stake. Further, the support of the housing on the stake is facilitated by the length of the housing which is substantially greater than the width so that the sidewall can tilt but will not fall off the stake as shown in FIG. 5. In the preferred embodiment the housing length to width ratio is about two to one (2:1) and a housing one and one half inches (1½") in width and three inches (3") in length has been found satisfactory. This provides about fifty percent (50%) clearance for a one inch (1") square stake inside a one and one half inch (1½") square tubular housing.

With the netting 15 knotted within the housing 14 and the straps 16 extending downwardly from the slots 24, the plant support 10 can be positioned for supporting a plant. A conventional stake 11 is placed adjacent to the plant and the open lower end 20 of the housing 14 is positioned over the top of the stake 11. The housing 14 can be cylindrical, square or any other conventional shape and size so that it essentially cups the top of the stake 11 to retain the housing 14 upon the stake 11 and support the netting 15 and straps 16 for supporting the plant 12. As a plant grows from the size shown in FIG. 1 to the size shown in FIG. 2 the plant parts can be readily manipulated through the diamond-shaped opening of the netting 15. Plant branches 9 extending through the netting can be supported by wire ties 19 attached to the straps 16 at the openings 18. Alternatively, the plant 17 can be attached about the stake 11 as by the straps 16 which can be wrapped about the plant 17 and stake 11 and then drawn back through the strap openings 18 to draw the strap fairly taut about the plant 17 and stake 11. The straps 16 are not always needed and in some instances the support provided to the plant 17 by the netting alone is sufficient. In other instances the straps 16 provide sufficient support without the netting. As described the netting 15 and the straps 16 both provide flexible means connected to the housing 14 for supporting the plant during growth.

The diamond-shaped openings in the netting 15 will allow the fruit 27 to be picked from the plant 17 through the netting thereby obviating the necessity of removing the netting 15 from the plant 17 in order to gather the fruit 27.

Should it become necessary to provide additional support straps or cords in order to support a particular plant 17 these additional straps or cords can be anchored to the housing 14 by tying them through the openings 25 thereby providing support for the additional straps.

I claim as my invention:

1. A plant support comprising:
   (a) a plant stake having an upper end portion,
   (b) a hollow housing having an upper end portion and a lengthwise extending sidewall portion said housing being sized to receive the plant stake therewithin in loosely fitted relation, the stake upper end portion being engageable by the housing upper end portion and the housing being retained on the stake in liftably removable relation without the need for fasteners, and
   (c) a plurality of flexible straps each having a free distal end, said straps being carried solely by the housing in depending relation for selective attachment to the plant.

2. A plant support as defined in claim 1, in which:
   (d) the housing is elongate having a length greater than the width thereof to permit tilting of the housing while maintaining the housing on the stake.

3. A plant support as defined in claim 1, in which:
   (d) the housing sidewall portion includes a plurality of apertures receiving the flexible straps.

4. A plant support as defined in claim 1, in which:
   (d) the housing includes an interior storage space for the straps.

5. A plant support comprising:
   (a) a plant stake having an upper end portion,
   (b) a hollow housing having an upper end portion and a lengthwise extending sidewall portion said housing being sized to receive the plant stake therewithin in loosely fitted relation, the stake upper end portion being engageable by the housing upper end portion and the housing being retained on the stake in liftably removable relation without the need for fasteners,
   (c) flexible means having free distal ends, said flexible means being connected to the housing and carried solely by the housing in depending relation for selective attachment to the plant, and
   (d) the housing including an interior storage space for the flexible means.

6. A plant support for connection to a plant stake comprising:
   (a) a housing supportably receivable by the plant stake,
   (b) flexible means connected to the housing and extending downwardly therefrom,
   (c) the housing including an upper end having an opening, (d) the flexible means including netting, and said netting extending from within the housing, out of the end opening and down about the housing,
(e) the netting includes a knotted end within the housing, the knot retaining the netting end within the housing,
(f) the flexible means further including
a plurality of straps carried by the housing, the netting knotted end engaging the straps within the housing and fastening the straps to the housing.

* * * * *